Dec. 17, 1929.                W. P. KENT                1,739,794
                PHONOGRAPH RECORD TRANSLATING DEVICE
                    Filed Dec. 12, 1927        2 Sheets-Sheet 1

INVENTOR:
Willys P. Kent
BY Frederick Rutenfeld
ATTORNEY

Dec. 17, 1929.  W. P. KENT  1,739,794
PHONOGRAPH RECORD TRANSLATING DEVICE
Filed Dec. 12, 1927  2 Sheets-Sheet 2
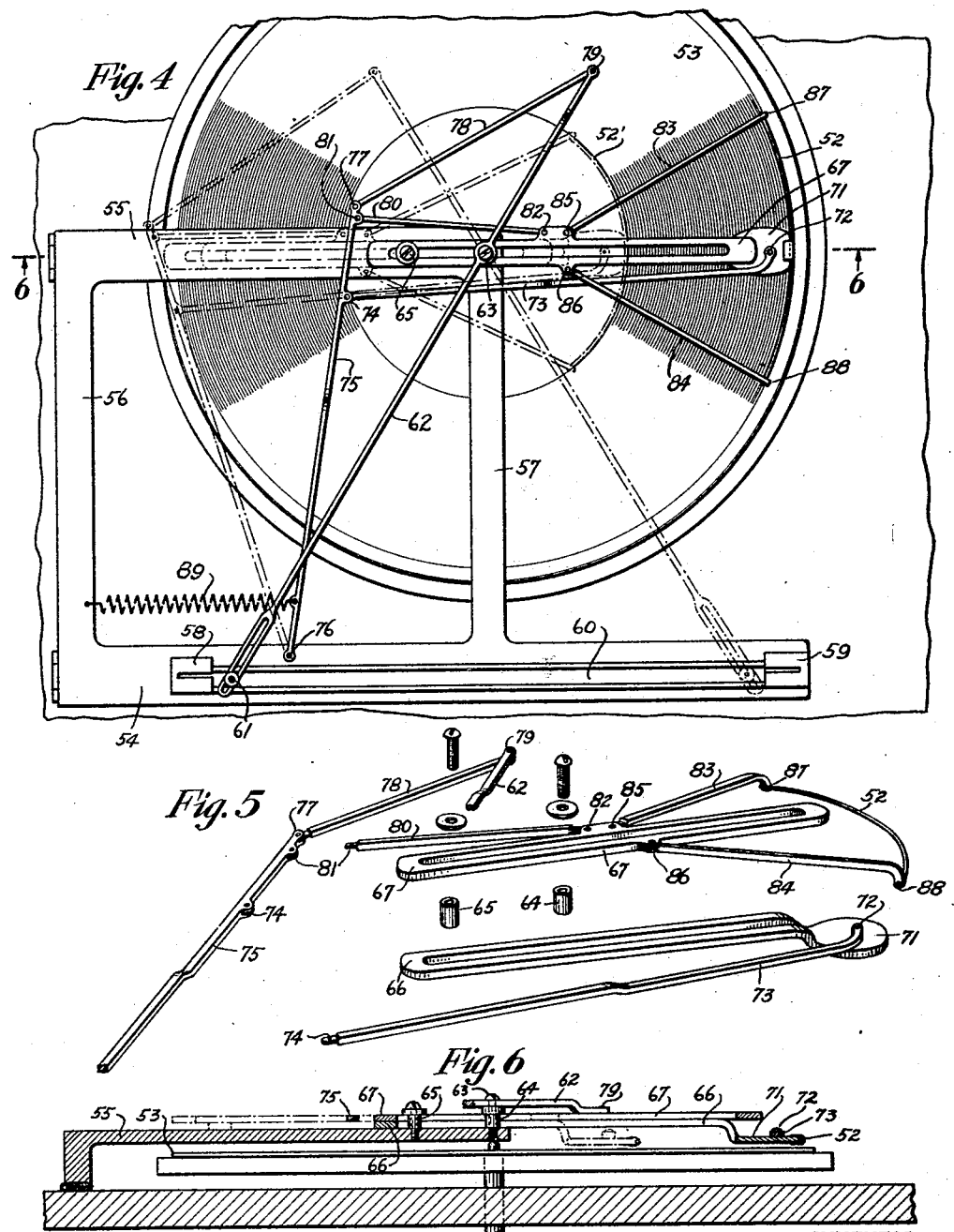
INVENTOR:
Willys P. Kent
BY 
ATTORNEY Patented Dec. 17, 1929

1,739,794

UNITED STATES PATENT OFFICE

WILLYS P. KENT, OF NEW YORK, N. Y.

PHONOGRAPH-RECORD-TRANSLATING DEVICE

Application filed December 12, 1927. Serial No. 239,352.

My present invention relates generally to phonographs, particularly to the character employing disc records; and has particular reference to a device for translating the subject matter of a record into visible form while the record is being played.

It is an object of my invention to provide a device which may be employed for the teaching of such subjects as appreciation of music, or the like, and it is a particular object to provide a device usable in a classroom or before a similar audience.

In carrying out my invention, I contemplate the employment of a chart bearing indicia relating to the subject matter of a particular record, and means actuated in timed relation to the playing of the record for causing a pointer to move over the chart, and thereby point out, as the record is being played, various features thereof which are to be pointed out to the audience. In accordance with my invention, I provide means whereby the movement of the tone arm or needle in passing over the record will cause a relative movement of pointer and chart.

It is one object of my present invention to provide means for transmitting the movement of the tone arm or needle upon an enlarged scale to the movable pointer or chart element. In this way, the device may be employed before a relatively large group.

It is another object of my invention to provide a device wherein a chart may be provided in the form of an elongated strip or card, and wherein the card may be mounted along a substantially straight line, i. e., without bending the card; the actuating mechanism being so constructed and arranged that, despite any pivotal movement of the tone arm or arcuate path of travel of the needle, the relative movement of pointer and chart will be along a substantially straight line. I have found that in this way the largest number of persons may clearly see all portions of the chart during the complete playing of the record.

Another object of my invention is to provide a device of the foregoing character which is extremely simple in construction and compact in nature, despite the magnification of the needle movement; and more particularly, it is an object to provide a device which will fit in its entirety upon the top platform of a phonograph. In this way, I am enabled to dispense with any lengthy and cumbersome projecting parts or arms.

More particularly, it is an object to provide a device which is so compact and of such construction that it may be retained upon the usual turntable while not in use, and which will permit the usual closing of the phonograph over it. A feature of my invention lies in providing means for pivotally supporting the device upon the top platform, as for example along a side edge thereof, so that its use is greatly facilitated. A device constructed in accordance with my invention may be swung downwardly onto the turntable when it is employed or when the cover is to be closed, and may be swung upwardly off the turntable in a convenient manner while the records are being changed or whenever it is desired to dispense with its use for the time being.

One of the most important objects of my invention lies in providing means whereby a device of the foregoing character may be employed in a satisfactory manner in connection with a common record and a common accompanying chart, despite the particular phonograph reproducing device upon which the record is played. It is well known that different makes of phonographs employ different arrangements of tone arms and different lengths thereof, and that as a result the path of travel of the needle in one type of phonograph will be different, even over the same record, from the path of travel of the needle in a different make of phonograph.

Accordingly, where I employ the movement of the needle as the means for actuating the pointer or chart element, it follows that if needle paths differ in different machines the employment of a common chart in connection with these machines would result in untruthful translation of the subject matter of the record in one or more of such machines. In other words, the pointer may, in the employment of one type of machine, move over the chart in a truthfully conformable manner with relation to the record being played; but if this same record and this same chart is employed with a machine of different structural characteristics and having a different path of needle travel, then the pointer will move over the chart in a different manner and the readings of the chart will not conform accurately to the subject matter of the record as the latter is played.

In accordance with my invention, I provide a device which may be used with accuracy upon any one of a plurality of machines and by the employment of the same previously prepared chart. I achieve this desirable feature by providing a follower edge upon a movable member, the follower edge being designed for actuation by the needle and being so constructed and arranged as to render the particular path of travel of the needle, during its travel over the record, immaterial.

In one form of my invention, I provide a plurality of follower edges in a manner whereby they may be selectively employed, depending upon the path of needle travel. More particularly, it is a feature of my invention to provide a plurality of follower edges respectively designed for employment with a particular set of needle travels, and I provide means for employing at will the proper selected follower edge.

In another and preferred form of my invention, I provide a follower edge which is so constructed as to be itself usable in connection with any needle travel, while always compensating for the needle travel and rendering the particular path of such travel immaterial. More particularly, it is a feature of my invention to provide a follower edge whose configuration is changeable; and to provide means for automatically causing this follower edge to be always concentric with the record being played. In this way, the path of travel between any two selected concentric lines is rendered wholly immaterial.

It will be understood that as to certain phases of my invention, as for example, the variable follower feature, I am by no means limited to the employment thereof in connection with a device of the present character; such feature or features constituting by themselves inventions relating to mechanical movements which may have a wide applicability in other fields.

For the attainment of the foregoing objects and such other objects as may hereinafter appear or be pointed out, I have constructed several devices embodying the features of my invention and illustrated in the accompanying drawings in which—

Fig. 4 is a view similar to Figure 2 showing a modified form of construction;

Fig. 5 is an exploded view of several of the parts shown in Figure 6, certain of these parts being broken away;

Fig. 6 is a front cross-sectional elevation taken substantially along the line 6—6 of Figure 4; and Fig. 7 is a portion of Figure 6 shown upon a greatly enlarged scale.

Figure 1:
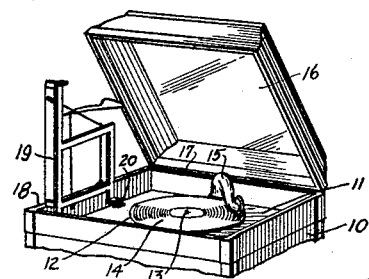
Fig. 1 is a perspective view of the upper portion of a phonograph device showing the usual top platform, the cover thrown back, and a device embodying the features of the present invention associated with the platform and in inoperative position.
Figure 2:
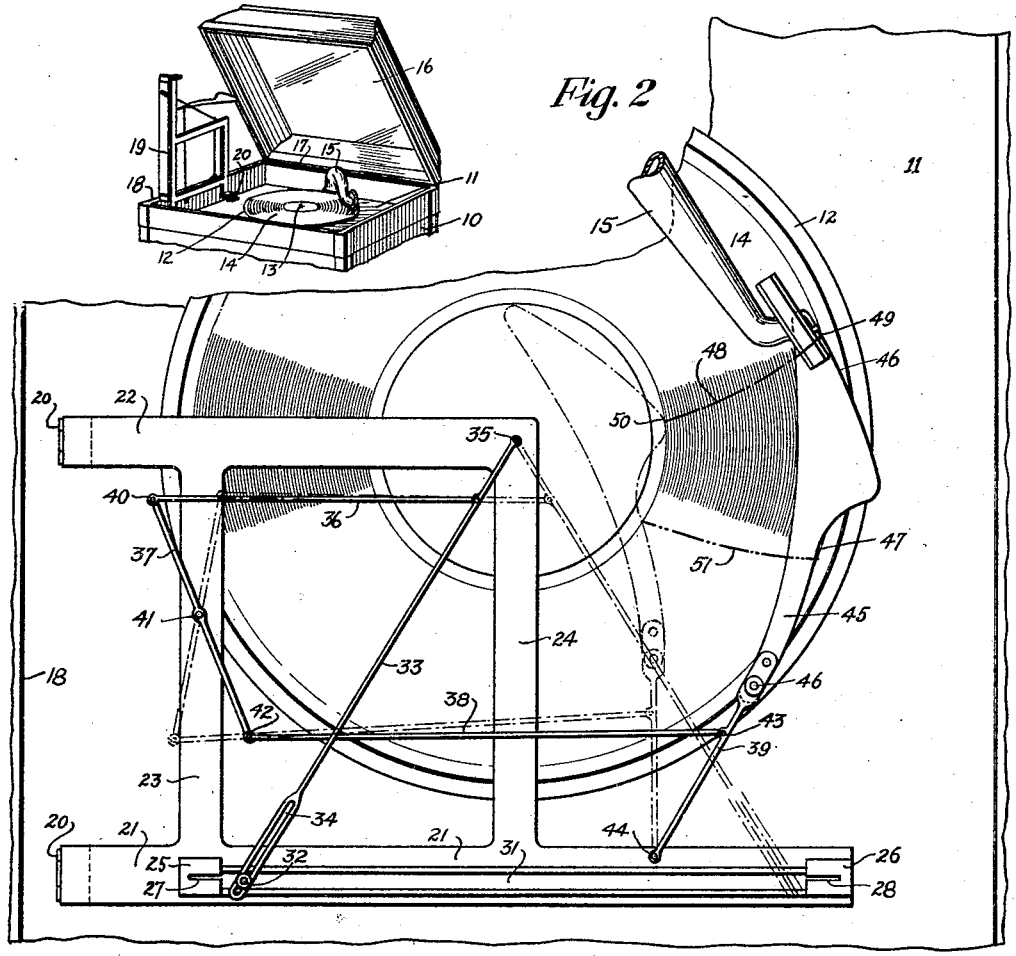
Fig. 2 is a plan view of the major portion of the top platform with the device of Figure 1 in operative position, the dot and dash lines indicating the positions assumed by the several parts during one period of operation.
Figure 3:
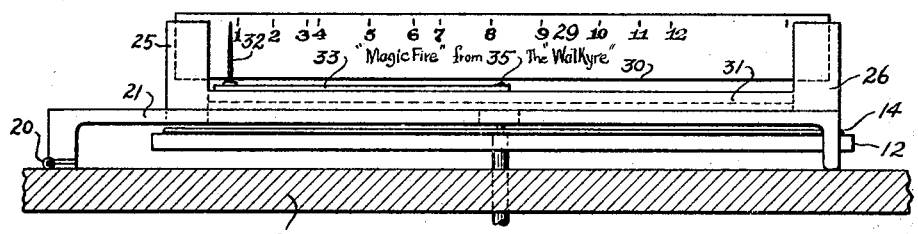
Fig. 3 is a cross-sectional elevation, taken from the front, through the platform and along a line immediately in front of the device.

Referring to Figures 1, 2, and 3, I have shown a phonograph cabinet 10 having the usual top platform 11 upon which a turntable 12 is arranged, the spindle of the turntable being shown at 13 and a disc record 14 being shown thereon. A tone arm 15 of ordinary construction is shown in operative position with respect to the record. A cover 16 hinged to the rear edge 17 of the structure 10 is shown in opened position, it being understood that this cover is of the usual character designed for closure over the platform 11 when desired.

A devise embodying the features of my invention is pivotally associated with the side edge 18 of the structure 10 and comprises a supporting frame 19 hinged at 20 to the side of the platform 11 so as to be pivotally movable into the inoperative position of Figure 1 wherein the frame is substantially vertical, and into the operative position of Figure 2 wherein the frame is substantially horizontal and overlies the turntable 12.

Referring now to Figures 2 and 3, I will point out that the frame 19, which may be of any suitable shape or construction, is in the illustrated embodiment composed of a front frame element 21 substantially parallel to the front edge of the structure 10, a rear frame element 22 substantially parallel to the element 21, and two transverse connecting frame elements 23 and 24. The elements 21 and 22 are provided at their left ends with the hinge arrangements 20 which permit the device as a whole to be thrown up into the position of Figure 1 or down into the position of Figure 2. The frame elements are so designed as to properly support the movable parts of the device, and for the sake of added support, the elements 22 and 24 are so arranged that substantially at the area of juncture therebetween they overlie the spindle 13 of the turntable.

Supporting means for a chart element are provided upon the frame element 21 and in the form shown, they comprise two upstanding supports 25 and 26 provided respectively with juxtaposed slots 27 and 28. The slots do not extend all the way down, and a chart 29 is therefore capable of being supported within the slots 27 and 28 in the manner shown in Figure 3, the lower edge 30 of the chart being spaced from the upper surface of the frame element 21. Extending between the supports 25 and 26, is a guideway which I have shown in the form of a channel 31, the function of the guideway being to guide a pointer element 32 along a substantially straight line almost coincident with the plane of the chart 29. Referring to Figure 3, wherein the pointer 32 is shown at the left end of the chart 29, I will state that in the operation of the device, this pointer will move to the right over the chart 29 and thereby indicate during successive periods of playing certain indicia borne by the chart and referring to the subject matter of the record being played.

It will be obvious that the chart may be of any suitable length, but in accordance with certain phases of my invention I prefer to make this length such that the supports 25 and 26 will be contained within the bounds of the platform 11. In other words, although my invention is by no means limited to such a construction, I prefer to make the chart of a length no greater than the length of the front edge of the structure 10. It will be noted that the chart lies along a straight line. I have found that this facilitates observation thereof by the greatest number of people.

The pointer 32 is actuated by means of a rod 33 provided at its forward end with a slot 34 which engages about the pointer 32. The rod 33 is pivoted at its rear end 35 and is adapted to swing from the full line position of Figure 2 into the dotted line position thereof. During this movement, the pointer 32 will be shifted along the guideway 31 from the left to the right portion of the chart 29, the slot 34 compensating for the fact that the rod 33 swings through an arc whereas the pointer 32 moves along a substantially straight line.

The rod 33 is actuated by mechanism which comprises the link 36, the lever 37, the link 38, and the pivotally movable member 39. The links 36 and 38 are substantially parallel to the frame element 21. The link 36 is pivoted at 40 to the rear end of the lever 37; the latter is pivotally supported at 41 to the frame element 23, and the link 38 is pivotally connected at 42 to the opposite end of the lever 37. The opposite end of the link 38 is pivotally connected at 43 to the member 39 which is in turn pivotally mounted at 44 to the frame element 21.

The actuation of the member 39 so as to swing it from the full line position of Figure 2 to the dotted line position thereof may be effected by the tone arm itself or, preferably, by the phonograph needle during its traverse of the record. I have shown a follower member 45 removably associated as at 46 with the member 39, the member 45 having a follower edge which comprises a forward portion 46 and a rearward portion 47. Only one of these follower portions is designed to be employed at one time.

The dot and dash line 48 indicates the path of travel of the phonograph needle of the type of phonograph machine shown in Figure 1, during the playing upon that machine of the disc record 14. The path extends from the outer edge 49 of the groove portion to the inner edge 50 thereof, and the path is an arcuate one, the center thereof being located in the rear central portion of the platform, i. e., at the pivot point of the tone arm 15. The dot and dash line 51, on the other hand, indicates the path of travel of the needle of a different type of phonograph machine, wherein the tone arm has its pivot point in the rear right-hand corner of the platform 11. Although both machines will reproduce the record, nevertheless it will be obvious that the paths of travel 48 and 51 are decidedly different both in degree of curvature and in length. Accordingly, if a common chart 29 is to be employed with the record 14, whether the latter is reproduced on one or the other of these two machines, and if the pointer element 32 is to be actuated by the needle during its movement, some means must be provided for compensating for the different needle paths 48 and 51.

The means I have provided in the form shown in Figure 2 lies in the proper designing of the follower edges 46 and 47. More particularly, the follower edge 46 is laid out according to predetermined plan so as to be cooperable with the particular needle which travels over the path 48, viz, the needle carried by the sound box of the tone arm 15 shown in full in Figure 1 and shown partially broken away in Figure 2. A needle traveling this path and engaging the follower edge 46 will move the parts of the device through their predetermined phases so as to move the pointer 32 across the chart 29 in a predetermined manner and through a predetermined magnitude. On the other hand, the follower edge 47 is so designed as to be cooperable with the needle of a different machine which would travel the path 51, and when the edge 47 is actuated by this needle, the parts of the device will move in exactly the same manner through their predetermined phases, and the pointer 32 will move in exactly the same manner across the chart 29. The follower member 45 of Figure 2 may therefore be employed with the chart 29 and the record 14 when the latter is reproduced upon either of the two machines whose needles have the paths of travel 48 and 51 respectively. These paths are merely illustrative of the differing paths which different machines upon the market embody, and accordingly, it is within the contemplation of my invention to provide a set of members similar to the member 45, each thereof embodying one or more follower edges predeterminedly designed to cooperate with a particular path of needle travel. In other words, where the record 14 is to be reproduced upon a machine having a path of needle travel different from the paths 48 and 51, the member 45 would be replaced by a member similar thereto but having a properly designed follower edge for cooperation with said different path of needle travel. In this way, my device is usable with different types of machines, and for each record a common chart 29 may be provided. When the device is furnished upon a particular type of machine, the proper follower edge is provided therewith so that the common chart 29 may be employed when the record 14 is reproduced upon that machine. Obviously, therefore, after the device, with the proper follower edge, has been supplied for use upon a particular machine, the user may thereafter reproduce any desired record of usual construction, and regardless of make, ordering with such record the particular chart relating thereto.

Referring now to Figures 4-7, I have shown in this embodiment, a device wherein no interchanging of follower edges is necessitated. In its essence, I will point out that the device embodies a flexible follower edge 52 which is so constructed and arranged with respect to the device and its operation as to be constantly concentric with the record which is played. In other words, the follower edge 52 assumes the full line position of Figure 4 when the playing of the record 53 is initiated; and during the playing, the edge 52 automatically assumes concentric positions, the final position being shown in dot and dash lines at 52′. By virtue of this constant concentricity, any path of needle travel, regardless of curvature or length, will actuate the several parts of the device, including the pointer, through a set of predetermined phases and magnitudes. The device of Figure 4 may therefore be furnished for use upon any machine designed to reproduce disc records, and for each record to be reproduced, only a single chart need be manufactured and supplied, regardless of the machine upon which the record is to be reproduced.

I achieve this desirable result by the construction illustrated wherein a frame similar to the one described hereinbefore comprises a front frame element 54, a rear frame element 55, and transverse frame elements 56 and 57. Supports 58 and 59 are provided for the chart and a guideway 60 is provided for the pointer 61, as before. A slotted rod 62 causes the movement of the pointer, this rod being pivoted at 63 to the framework.

The pivot referred to is more clearly shown in Figures 5 and 6, and comprises a collar 64 which serves also as one of two guides. The other guide comprises a collar 65 mounted slightly to the left upon the frame element 55. The collars 64 and 65 are fixed, and serve as guides for the reciprocal movement of two slotted members 66 and 67, superposed upon one another.

The member 66 is bent downwardly at its right-hand end and is fixedly associated with the midportion of the flexible edge 52. This association is shown more clearly in Figure 7. The edge 52 may comprise a flexible wire 68 or coiled wire or the like, and it is preferably enclosed within a flexible rubber tube 69. A portion of this flexible tubing is slit so as to provide two flaps 70 which may be made to engage about the upper and lower surfaces of the end portion 71 of the member 66. Pivotally associated at 72 with the portion 71 of the member 66 is a link 73 whose opposite end is pivotally connected at 74 to a pivoted lever 75. The latter is pivoted at 76 to a fixed point upon the frame element 54 and is designed to swing from the full line position of Figure 4 into the dotted line position thereof when a needle or tone arm encounters and pushes the follower edge to the left during the playing of a record. At the rear end 77 is pivoted a link 78 whose opposite end is pivoted at 79 to the rear end of the lever 62. When the member 66 is moved toward the left during the playing of a record, the link 73 forces the lever 75 into the dotted line position, and the link 78 transmits this movement to the lever 62 and swings the latter through its arc of movement into the dotted line position of Figure 4, thereby moving the pointer 61 across the chart (not shown).

The slotted member or rod 67 is the one which controls the alteration of configuration of the edge 52 during the movements described in the previous paragraphs. It is independent of the member 66 although guided by the same collars 64 and 65. It moves to the left when the member 66 moves to the left, and it moves to the right when the member 66 moves to the right, but its movements are at a different rate of speed and are caused by the link 80 pivoted at 81 to the lever 75 and at 82 to the member 67. The position of the pivot point 81 with respect to the position of the pivot point 74 determines the difference in rates of movement between the members 66 and 67.

Carried by the member 67 are two control arms 83 and 84 pivoted at their rear ends to the member 67 at the points 85 and 86 respectively. These arms 83 and 84 extend in a diverging manner toward the right and engage the spaced portions 87 and 88 respectively of the flexible edge 52.

If the members 66 and 67 move toward the left at the same rate of speed, the flexible edge 52 would retain its configuration; but since the member 67 moves at a predeterminedly greater rate of speed, the spaced points 87 and 88 are forced relatively further to the left of the midportion of the flexible edge 52 as the midportion (fixedly associated with the member 66) moves toward the left. Accordingly, the edge 52 automatically changes its curvature as it travels toward the left across the groove portion of the record.

In Figure 4, I have shown the possible arrangement of a spring 89 which is a very weak one and which may be made to extend between the lever 75 and the frame element 56. This spring may facilitate the movement of the lever 75 and withdraw just so much load from the needle.

The foregoing description and the accompanying drawings explain the nature of my invention, and innumerable refinements may be made in the embodiments specifically illustrated and described. For example, the follower edge may constitute one edge of a slot within which the needle or similarly movable portion of the reproducing mechanism engages. In this way, the needle might be moved back and forth at will so as to play or replay selected portions of the record, and the follower edge would automatically be carried with the needle during this optional positioning thereof. Furthermore, the arrangement of links and levers which transmit the movement of the needle or tone arm to the movable pointer element may be rearranged in any manner suitable to differing requirements, and such rearrangement might easily be effected by anyone skilled in the art without departing from the spirit and scope of the invention as expressed in the appended claims. It is therefore intended that the details herein described and illustrated for the purpose of explaining the nature of my invention be interpreted as illustrative, and not in a limiting sense.

Having thus described my invention and illustrated its use, what I claim as new and desire to secure by Letters Patent is—

1. For use with a common phonograph disc record, a common chart bearing indicia relating to the subject matter of the record, and a selected one of a plurality of phonograph reproducers whose needles have differing paths of travel; a record-translating device comprising a pointer movable over the chart, and means operable by the needle of the phonograph reproducer during its traverse of the record for moving the pointer, said means including an arcuate follower edge constantly concentric with the record, whereby the pointer will always move in the same predetermined relationship to the play of the record regardless of the path of needle travel.

2. For use with a common phonograph disc record, a common chart bearing indicia relating to the subject matter of the record, and any one of a plurality of phonograph reproducers whose needles have differing paths of travel; a record-translating device comprising a pointer, means for causing relative movement of the pointer and the chart, and means operable during the needle travel of the selected reproducer for causing said relative movement; said means including an arcuate follower edge, and means for automatically altering the curvature of said edge to render it constantly concentric with the record, whereby the relative movement of pointer and chart will always be the same regardless of the path of needle travel.

3. For use with a common phonograph disc record, a common chart bearing indicia relating to the subject matter of the record, and any one of a plurality of phonograph reproducers whose needles have differing paths of travel; a record-translating device comprising a pointer, means for causing relative movement of the pointer and the chart, and means operable during the needle travel of the selected reproducer for causing said relative movement; said means including an arcuate follower edge, and means for automatically altering the curvature of said edge to render it constantly concentric with the record, whereby the relative movement of pointer and chart will always be the same regardless of the path of needle travel, said means including relatively movable members associated with spaced portions of the follower edge respectively.

4. For use with a common phonograph disc record, a common chart bearing indicia relating to the subject matter of the record, and any one of a plurality of phonograph reproducers whose needles have differing paths of travel; a record-translating device comprising a pointer, means for causing relative movement of the pointer and the chart, and means operable during the needle travel of the selected reproducer for causing said relative movement; said means including an arcuate follower edge, and means for automatically altering the curvature of said edge to render it constantly concentric with the record, whereby the relative movement of pointer and chart will always be the same regardless of the path of needle travel, said means including relatively movable members associated with spaced portions of the follower edge respectively, and means for moving said members in predetermined relationship.

5. As a mechanical movement, an actuating element having a predetermined path of travel, and a member moved thereby, said member presenting a follower edge to said element, and means for altering the configuration of said follower edge during said movement.

6. As a mechanical movement, an actuating element having a predetermined path of travel, and a member moved thereby, said member presenting a follower edge to said element, and means for causing predetermined automatic alteration of the configuration of said follower edge during said movement.

7. For use with a phonograph disc record, a device comprising a chart element bearing indicia relating to the subject matter of the record, a pointer element, one of said elements being movable relative to the other, and means for transmitting the movement of the phonograph needle during its traverse of the record, upon an enlarged scale, to said movable element; said means including a movable member encounterable by the needle during its movement.

8. For use with a phonograph disc record, a device comprising a chart element bearing indicia relating to the subject matter of the record, a pointer element, one of said elements being movable relative to the other, and means for transmitting the movement of the phonograph needle during its traverse of the record, upon an enlarged scale, to said movable element; said means including a movable member encounterable by the needle during its movement, and transmitting mechanism including a set of levers between said movable member and said movable element.

9. For use with a phonograph including a top platform provided with a turntable adapted to receive a phonograph disc record, a device comprising a chart element bearing indicia relating to the subject matter of a record, a pointer element, one of said elements being movable relative to the other, and means for transmitting the movement of the phonograph needle during its traverse over said record, upon an enlarged scale, to said movable element; said means lying wholly within the bounds of said top platform.

10. For use with a phonograph including a top platform provided with a turntable adapted to receive a phonograph disc record, a device comprising a chart element bearing indicia relating to the subject matter of a record, a pointer element, one of said elements being movable relative to the other, and means for transmitting the movement of the phonograph needle during its traverse over said record, upon an enlarged scale, to said movable element; said means lying wholly within the bounds of said top platform and comprising a movable member encounterable by the needle during the latter's movement, and transmitting mechanism operatively interposed between said movable member and said movable element.

11. For use with a phonograph including a top platform provided with a turntable adapted to receive a phonograph disc record, a device comprising a chart element bearing indicia relating to the subject matter of a record, a pointer element, one of said elements being movable relative to the other, and means for transmitting the movement of the phonograph needle during its traverse over said record, upon an enlarged scale, to said movable element; said means lying wholly within the bounds of said top platform; and means for pivoting said device to said platform.

12. For use with a phonograph disc record, a device comprising a chart element bearing indicia relating to the subject matter of the record and arranged along a substantially straight line, a pointer element, one of said elements being movable relative to the other so that the pointer will move in a substantially straight line over said chart; and means for transmitting the movement of the phonograph needle during its traverse of the record to said movable element.

13. For use with a phonograph disc record, a device comprising a chart element bearing indicia relating to the subject matter of the record and arranged along a substantially straight line, a pointer element, one of said elements being movable relative to the other so that the pointer will move in a substantially straight line over said chart; and means for transmitting the movement of the phonograph needle during its traverse of the record to said movable element, said means comprising a substantially straight guide for said movable element, and a pivoted member associated with and actuating said element.

14. For use with a phonograph including a top platform provided with a turntable adapted to receive a phonograph disc record, a device comprising a chart element bearing indicia relating to the subject matter of the record, means for mounting said chart element along a substantially straight line adjacent one edge of said platform, a pointer element, one of said elements being movable relative to the other so as to cause the pointer to move over the chart, and means for transmitting the movement of the phonograph needle during its traverse over said record, upon an enlarged scale, to said movable element; said means comprising a movable member encounterable by the needle during its movement, transmitting mechanism including a set of levers between said movable member and said movable element, said mechanism lying wholly within the bounds of said top platform; and means for pivoting said device to one edge of said platform.

15. For use with a phonograph disc record, a device comprising a chart element bearing indicia relating to the subject matter of the record, a pointer element, one of said elements being movable relative to the other, and means for transmitting the movement of the phonograph needle during its traverse of the record, upon an enlarged scale, to said movable element; said means including a movable member encounterable by the needle during its movement; said member comprising a reciprocally movable rod, a follower edge adjustably mounted thereon for engagement by the needle, and means for automatically adjusting said edge to alter its configuration during the movement of the needle and said member.

16. For use with a phonograph disc record, a device comprising a chart element bearing indicia relating to the subject matter of the record, a pointer element, one of said elements being movable relative to the other, and means for transmitting the movement of the phonograph needle during its traverse of the record, upon an enlarged scale, to said movable element; said means including a movable member encounterable by the needle during its movement; said member comprising a reciprocally movable rod, a follower edge adjustably mounted thereon for engagement by the needle, and means for automatically adjusting said edge to alter its configuration during the movement of the needle and said member, said last named means comprising a lever pivotally connected to said rod, a second rod reciprocally movable, and a link pivotally connecting said second rod and a spaced point on said lever.

17. As a mechanical movement, an actuating element having a predetermined path of travel, a member moved thereby and presenting a follower edge to said element, said edge comprising a flexible member, and means for causing predetermined automatic alteration of the configuration of said follower edge during said movement; said means comprising control arms engaging said flexible member at spaced points, and means for moving said control arms in predetermined relationship to the movement of said edge.

18. As a mechanical movement, an actuating element having a predetermined path of travel, a member moved thereby and presenting a follower edge to said element, said edge comprising a flexible member, and means for causing predetermined automatic alteration of the configuration of said follower edge during said movement; said means comprising control arms engaging said flexible member at spaced points, and means for moving said control arms in predetermined relationship to the movement of said edge; said last named means comprising a lever actuated by said moved member, and a link extending between said lever and said control arms.

19. For use with a phonograph disc record, a device comprising a chart element bearing indicia relating to the subject matter of the record, a pointer element, one of said elements being movable relative to the other, and means for transmitting the movement of the phonograph needle during its traverse of the record to said movable element; said means including a movable member encounterable by the needle during its movement; said member including a flexible follower edge for engagement by the needle, and means for automatically flexing said edge during the movement of the needle and said member so as to cause said edge to be constantly concentric with the record.

In witness whereof I have signed this specification this 7th day of Dec., 1927.

WILLYS P. KENT.